(12) United States Patent
Garg

(10) Patent No.: US 7,460,260 B2
(45) Date of Patent: Dec. 2, 2008

(54) METHOD OF PROVIDING CONTINUOUS FEEDBACK

(75) Inventor: Man M. Garg, Cerritos, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 964 days.

(21) Appl. No.: 10/626,378

(22) Filed: Jul. 24, 2003

(65) Prior Publication Data

US 2005/0038886 A1 Feb. 17, 2005

(51) Int. Cl.
*G06F 15/00* (2006.01)
(52) U.S. Cl. .................. 358/1.15; 370/230; 709/220
(58) Field of Classification Search ....... 358/1.11–1.18, 358/1.1–1.9; 704/3; 709/220; 370/230
See application file for complete search history.

(56) References Cited

U.S. PATENT DOCUMENTS

| | | | |
|---|---|---|---|
| 6,108,099 A | 8/2000 | Ohtani | |
| 6,219,148 B1 | 4/2001 | Takashima | |
| 6,219,151 B1 | 4/2001 | Manglapus et al. | |
| 6,327,045 B1* | 12/2001 | Teng et al. | 358/1.15 |
| 6,338,033 B1* | 1/2002 | Bourbonnais et al. | 704/3 |
| 6,418,456 B1 | 7/2002 | Mastie et al. | |
| 6,734,985 B1* | 5/2004 | Ochiai | 358/1.15 |
| 7,064,849 B1* | 6/2006 | Nishikawa et al. | 358/1.15 |
| 2002/0057449 A1 | 5/2002 | Chapman et al. | |
| 2002/0075508 A1 | 6/2002 | Luman | |
| 2002/0075510 A1 | 6/2002 | Martinez | |
| 2002/0105671 A1* | 8/2002 | Sugahara | 358/1.15 |
| 2002/0114004 A1 | 8/2002 | Ferlitsch | |
| 2002/0116480 A1* | 8/2002 | Muto | 709/220 |
| 2002/0131070 A1 | 9/2002 | Housel et al. | |
| 2002/0138558 A1 | 9/2002 | Ferlitsch | |
| 2003/0011805 A1 | 1/2003 | Yacoub | |

(Continued)

FOREIGN PATENT DOCUMENTS

EP 0 848 539 6/1998

(Continued)

OTHER PUBLICATIONS

Translation for Japanese Patent Publication JP 10289070 A.*

(Continued)

*Primary Examiner*—King Y Poon
*Assistant Examiner*—Lennin R Rodriguez
(74) *Attorney, Agent, or Firm*—Tucker Ellis & West, LLP

(57) ABSTRACT

A feedback component which adds on to a spooler and utilizes the spooler's connectivity with the network clients for communications. The network clients connect to the feedback component through the spooler's application programming interface (API) by making a request to register for feedback. Once the request is received, the feedback component continuously provides the network components with status of jobs in readable text and codes as the jobs progress in the underlying printing system. These status messages are not limited to just print status messages like printing, paused, printed, etc., but may include customized status messages for any device in the printing system such as scheduled, dialing, sending-fax, etc. In addition, a time delay may be introduced between messages in order to prevent excessive traffic being sent during times of heavy traffic.

16 Claims, 3 Drawing Sheets

U.S. PATENT DOCUMENTS

2003/0025935 A1  2/2003  Somei

FOREIGN PATENT DOCUMENTS

| JP | 10289070 | 10/1998 |
| JP | 11039110 | 2/1999 |
| JP | 11085414 | 3/1999 |
| JP | 2002062999 | 2/2002 |

OTHER PUBLICATIONS www.merrioncomputing.com/programming/watchprinter.htm, "Monitoring a Print Queue from Visual Basic", Date unknown.

www.novell.com/documentation/lg/nw6p/ndps_enu/data/hhnv8lh4.html, "Optimizing Event Notification", Date unknown.

www.winguides.com/registry/display.php/779/, "Enable Print Job Notification Messages", Mar. 26, 2002.

Fitzpatrick, et al.,; "Poll-Free Print Queue Depth Notification", IBM TDB, vol. 35, No. 1B, Jun. 1992, p. 437.

\* cited by examiner

METHOD OF PROVIDING CONTINUOUS FEEDBACK

BACKGROUND OF THE INVENTION

The present invention relates generally to printing systems and more particularly to a method and system for communicating network printer status changes.

Printing systems, and in particular network printers, offer a myriad of features in addition to plain printing. Some of these features include scheduling, printing, private print, fax, and other types of document handling features. Because of these extra features, there are more status changes in the print job's lifecycle than with standard printing, such as Printing, Processing, Paused, Deleting, etc. Since all jobs are submitted to the printing system through a standard print driver, there is a need to communicate job progress through the standard print driver, in addition to any special client software provided by the printer manufacturer. Furthermore, because these states are more dynamic than normal printing, for example fax progress such as dialing, connecting, transmitting, etc., there is a need to communicate job progress in a continuous manner, practically in real time.

Thus, there is a need for a component in the frontline of the printing system that is capable of monitoring the printing system by monitoring event progress and communicating the job progress status to the printing clients connected to the printing system, wherein the clients are connected to the printing system through various protocols.

BRIEF SUMMARY OF THE INVENTION

In view of the aforementioned needs, the invention contemplates a component that is an add-on to a spooler and exploits the spooler's connectivity to the networking layers to receive print jobs. The component monitors the printing system by listening to status change messages and pushes the status changes to the clients as plain text that is localized to the client's language. While the preferred embodiment illustrates a component that is an add-on to a spooler, as those skilled in the art can readily appreciate the component may also be a part of the spooler.

One aspect of the present invention is a feedback component. The feedback component comprising means adapted for the component to register with the spooler's application programming interface. Once registered, the component can receive a status message from a spooler, receive a signal from an image output system, whereupon the image output system communicatively coupled to the spooler. The component determines a native language for a network client and sends a job state message to the network client. The job state is at least one of the group consisting of a status message and a signal from the printing system. The component translates the job state message to a format compatible with the network client, such as plain text.

Another aspect of the present invention is that it is customizable so that a network client may only receive a selected type of job status messages.

Still yet another aspect of the present invention is that the component may be adapted to delay sending the job status message for a first time period. If no other job status messages are received at the expiration of the first time period, the job status message is sent to the network client. However, if before the expiration of the first time period a second job status is received, the component waits until the end of a second predetermined time period before sending a status update, and normally sends only the most recent update. This is to avoid sending too many status messages in a short time period which may be irritating to the network client and would also prevent the printing system for bogging down networks with a high volume of network traffic.

Another aspect of the present invention is a method for providing continuous feedback from a printing system, comprising the steps of monitoring the printing system, receiving a status update, converting the status update to a format compatible with a network client; and sending the status update to the client. The component would ordinarily register with the printing system. The converting step may convert the status update to plain text, or to a foreign language compatible with the network client.

The method may further comprise waiting a first predetermined time period before sending the status update, and if another status update is received prior to the first predetermined time period, waiting a second predetermined time before sending a status update. The status update may comprise only the most recent status update, a plurality of status updates, or all of the status updates in a single message.

The method may also further comprise selecting a type of status update to be sent to the network client, wherein only messages of the selected type are sent to the network client. Thus the component would filter which status update messages are actually sent to the client. If method also includes the aforementioned time delay feature, only the selected status update messages are considered.

The present invention may be embodied in software, hardware or a combination thereof.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention. In the drawings.

DETAILED DESCRIPTION OF INVENTION

Throughout this description, the preferred embodiment and examples shown should be considered as exemplars, rather than limitations, of the present invention.

The present invention is directed to a feedback component which adds on to a spooler and utilizes the spooler's connectivity with the network clients for communications. The network clients connect to the feedback component through the spooler's application programming interface (API) by making a request to register for feedback. Once the request is received, the feedback component continuously provides the network components with status of jobs in readable text and codes as the jobs progress in the underlying printing system. These status messages are not limited to just print status messages like printing, paused, printed, etc., but may include customized status messages for any device in the printing system such as scheduled, dialing, sending-fax, etc.

In addition, the feedback component registers itself with the printing system by making a request. This causes the printing system to provide signals to the feedback component indicative of activity in the printing system.

On receipt of a signal from the printing system, the feedback component engages in a dialog with the print system to determine the job state. The feedback component then translates the job state to human understandable message in the client's native language and then sends the message to a network component to be displayed by the client. The process occurs in real time.

Another aspect of the present invention is the ability of the feedback component to delay the response by a predefined time, for example T1. This is to avoid sending too many feedback events to close together, especially in the event of heavy activity in the system.

Figure 1:
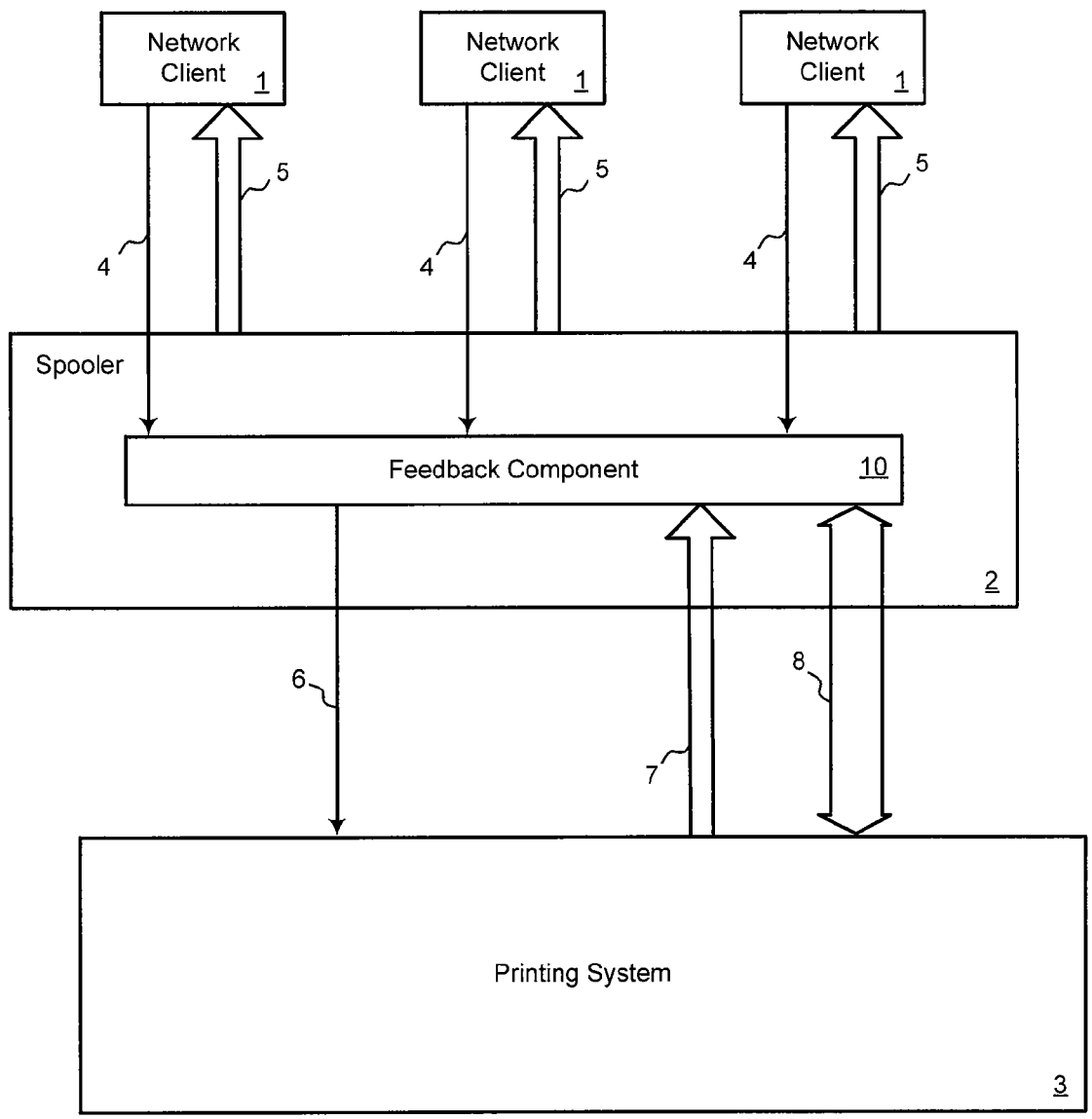
FIG. 1 is a block diagram showing the interconnections between the component and the printing system.

Referring now to FIG. 1, there is a block diagram illustrating the various interconnections of the feedback component 10 which is added on to spooler 2 and uses the spooler's connectivity 5 with the network clients 1 for communication.

In addition, the feedback component 10 registers itself with the printing system 3 by making a request as shown by arrow 6. This causes the printing system 3 to send signals indicating job states as shown by arrow 7 to the feedback component 10. Upon receipt of signals as shown by 7, the feedback 10 component may engage in a bidirectional dialog as shown by 8 with the printing system 3. The feedback component 10 then translates the signals 7 into a human understandable language such as text or a language such as a foreign language native to the network client 1. When a network client 1 desires to receive feedback, it sends a request to register for feedback via its connectivity to the spooler's API as shown by arrow 4. From then on the spooler sends feedback messages to the client via the spooler as indicated by arrow 5.

Figure 2:
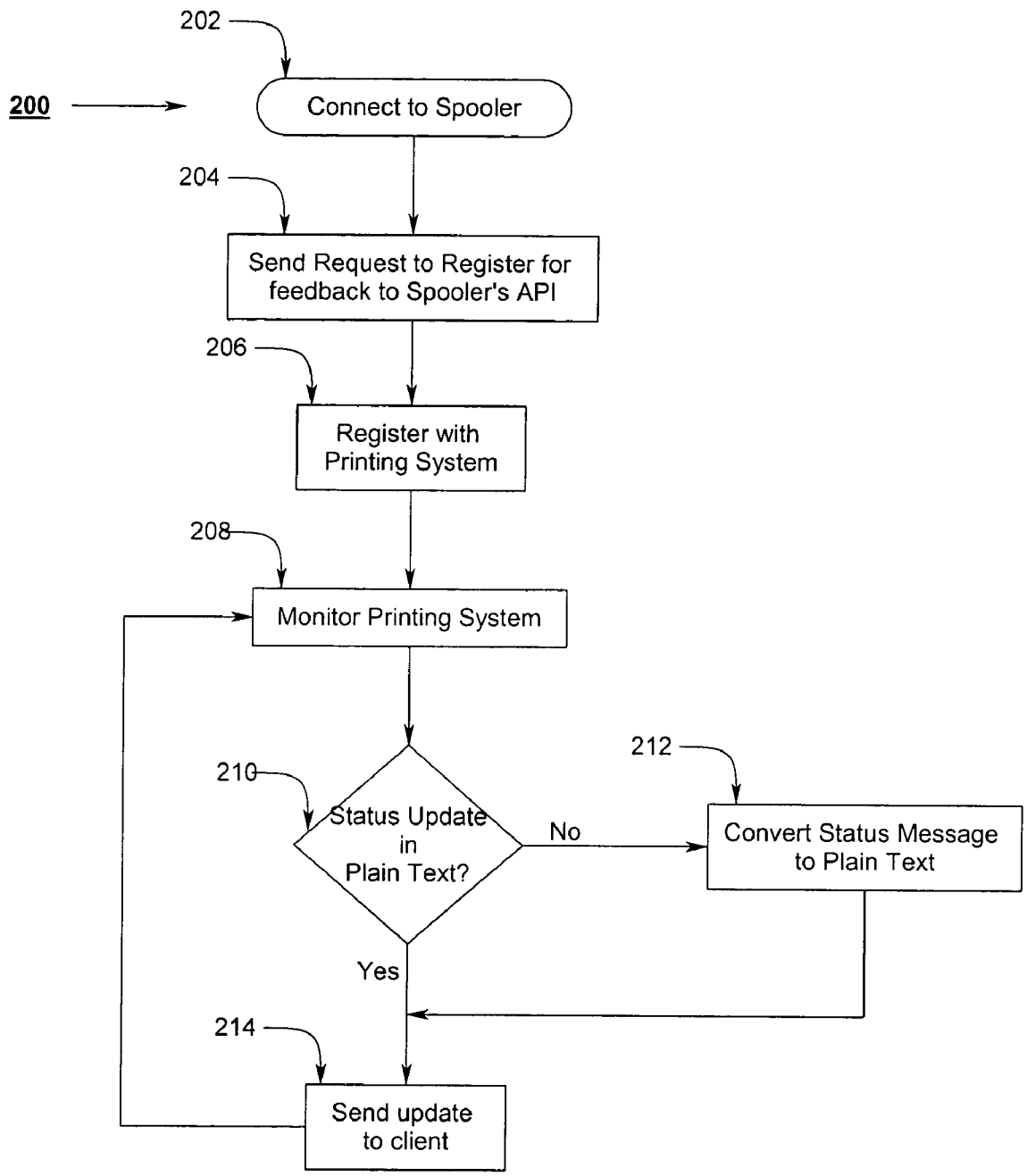
FIG. 2 is a block diagram illustrating a method of a preferred embodiment of the present invention.

Referring now to FIG. 2 with continued reference to FIG. 1, there is shown a method 200 for providing continuous feedback as contemplated by a preferred embodiment of the present invention. The method 200 begins at step 202 with a feedback component 10 connecting to a spooler 2. The feedback component 10 may be a separate module from the spooler 2 or may be a feature added on to the spooler 2. At step 204 a request to register for feedback is sent from a network client 1 via the spooler's 10 API (not shown). The feedback component 10 then registers with the printing system 3 at step 206.

At step 208 the feedback component 10 is monitoring the printing system 3 until a status update is received. At step 210 the feedback component determines if the status update is in plain text in the language of the client. If the status update is in plain text in client's language, then as shown in step 214 the status update is sent to the network client 1. If the status update is not in plain text or not in client's language, then as shown in step 212 the status update message is converted to plain text in client's language by the feedback component 10 and then sent to the network client at step 214. The feedback component 10 returns to monitoring the printing system 3 at step 208.

Another aspect of the present invention is the ability of the feedback component 10 to delay sending the response by a predefined time slice. This is illustrated by T1 on the time line of FIG. 3. Assuming that a status update $e_0$ is received at the 0 of the time line, if no other status messages are received at time T1, then the status message received at 0 will be sent to the network client 1. However, if another status update $e_1$ is received before time T1, then the system does not send a message at T1, but instead waits to see if there is more rapid activity till another predetermined time T2 and then sends the latest message received at or before time T2. For example if another message $e_2$ is received after T1, then message $e_2$ is sent at time T2. Typically, the message sent at T2 would be the latest status update, however, it is also contemplated that the system may send all of the messages received from 0 to T2 in one batch.

For example, if only event $e_0$ is received before time T1, then at time T1 event $e_0$ is sent to the network client 1. However, if event $e_1$ is received before T1 and is the only event received after $e_0$, then event $e_1$ will be sent to the network client 1 at T2. Finally, if events $e_0$ and $e_1$ are received before T1 and event $e_2$ is received before T2 then event $e_2$ is sent to the network client. This prevents the excessive network traffic when many events are occurring continuously, but yet insures the network client 1 does receive timely updates (at least one update every T2 time period).

Figures 3, 4:
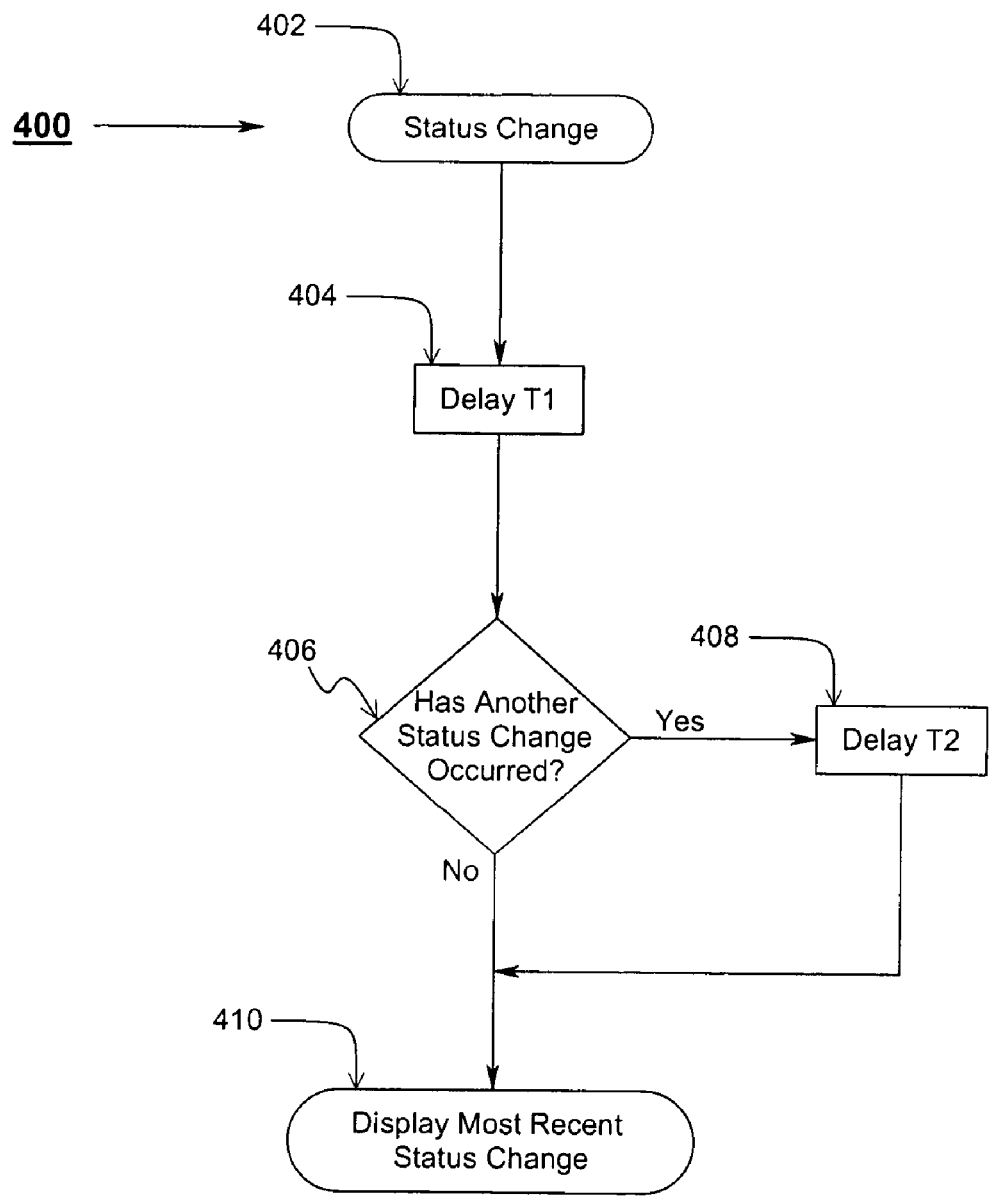
FIG. 3 is a time line diagram illustrating the relationship between a first predetermined time period and a second predetermined time period.
FIG. 4 is a block diagram of a method of the preferred embodiment of the present invention for delaying the sending of status updates.

Referring now to FIG. 4 with continued reference to FIG. 1 and FIG. 3, there is shown a method 400 illustrating the time delay aspect of the invention. At step 402 the feedback component receives a signal indicating a status change from the printing system 3. At step 404 the feedback component 10 waits or delays until time T1. At step 406 the feedback component determines whether another status change has occurred. If at step 406 another status change has occurred, then as shown at step 408 the feedback component 10 delays until T2 whereupon at step 410 the feedback component 10 sends the most recent status update to the network client 1 where it is displayed in plain text or in the native language of the network client 1. If at step 406 it is determined that no other status change message has been sent by the printing system 3, then the feedback component 10 sends the status message to the network client 1 for display (410).

Another aspect of the present invention is that the feedback component 10 is customizable. The network client 1 may communicate to the feedback component 10 which status updates it desires to receive. All other status messages would then be filtered out by the feedback component 10.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skill in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A feedback component, comprising:
   means adapted to receive a status message from a spooler of an associated document processing device;

means adapted to receive a signal from an image output system of the associated document processing device, the image output system communicatively coupled to the spooler;

means adapted to receive registration data at a spooler feedback component associated with the spooler from each of a plurality of associated network clients, the registration data being representative of a request for transmission of status messages for communication thereto;

means adapted to generate a job state message from the spooler feedback component, wherein the job state is at least one of the group consisting of the status message and the signal;

means adapted to translate the job state message to a text message content format compatible with a text message content format pre-associated with each of a plurality of different network clients;

means adapted to periodically push each translated job state message to at least one corresponding network client of the plurality of associated network clients in accordance with registration data of the spooler feedback component corresponding thereto;

means adapted to delay sending the job state message for a first time period;

means adapted to delay sending the job state message when a second job state message is received before the first time period expires;

network traffic monitoring means adapted for monitoring a data volume on an associated network; and means adapted to delay sending the job state message for a second time period when the second job state message is received in accordance with an output of the network traffic monitoring means and sends only the most recent state message when the second time period expires.

2. The feedback component of claim 1 further comprising means adapted to register with the spooler's application programming interface.

3. The feedback component of claim 1 wherein the status message is a text message.

4. The feedback component of claim 1 further comprising means adapted to determine a native language for the network client.

5. The feedback component of claim 1 further comprising means adapted to customize the job state message.

6. The feedback component of claim 1 further comprising means adapted to filter the job state message so that only a selected job status message is sent to the network client.

7. The feedback component of claim 1 wherein the feedback component sends only the most recent job state message when the second time period expires.

8. The feedback component of claim 1 wherein the feedback component comprises computer readable instructions stored on a computer readable medium.

9. A feedback component, comprising:

means adapted to register with a spooler's application programming interface;

means adapted to receive a status message from a spooler of an associated document processing device;

means adapted to receive a signal from an image output system of the associated document processing device, the image output system communicatively coupled to the spooler;

means adapted to receive registration data at a spooler feedback component associated with the spooler from each of a plurality of associated network clients, the registration data being representative of a request for transmission of status messages for communication thereto;

means adapted to determine a native language for a network client;

means adapted to generate a job state message from the spooler feedback component, wherein the job state is at least one of the group consisting of the status message and the signal;

means adapted to translate the job state message to a text message content format compatible with a text message content format pre-associated with each of a plurality of different network clients;

means adapted to periodically push each translated job state message to at least one corresponding network client of the plurality of associated network clients in accordance with registration data of the spooler feedback component corresponding thereto;

means adapted to filter the job state message so that only a selected job state message is sent to the network client;

means adapted to delay sending the job state message for a first time period;

means adapted to delay sending the job state message when a second job state message is received before the first time period expires:

network traffic monitoring means adapted for monitoring a data volume on the associated network; and means adapted to delay sending the job state message for a second time period when the second job state message is received in accordance with an output of the network traffic monitoring means and sends only the most recent state message when the second time period expires.

10. A method for providing continuous feedback from a printing system, comprising the steps of:

monitoring the printing system;

receiving a status update from a spooler of an associated document processing device;

receiving registration data at spooler feedback component associated with the spooler from each of a plurality of associated network clients, the registration data being representative of a request for transmission of status updates for communication thereto;

generating a job state update from the spooler feedback component;

converting the job state update to a text message content format compatible with a text message content format pre-associated with each of a plurality of different network clients;

periodically pushing each converted job state update to at least one corresponding network client of the plurality of associated network clients in accordance with the registration data received therefrom;

delay sending the job state message for a first time period;

delay sending the job state message when a second job state message is received before the first time period expires;

monitoring a data volume on the associated network; and delay sending the job state message for a second time period when a second job state message is received in accordance with an output of the network traffic monitoring step and sends only the most recent state message when the second time period expires.

11. The method of claim 10 further comprising registering with the printing system.

12. The method of claim 10 wherein the converting step converts the job state update to plain text.

13. The method of claim 10 wherein the converting step converts the job state update to a foreign language.

14. The method of claim 10 wherein the job state update sent to the client is the second status update.

15. The method of claim 10 further comprising receiving at least one additional job state update before a first predetermined time period expires; and waiting until a second predetermined time period expires;

wherein the sending step sends only the most recent job state update to the network client after the second predetermined time period expires.

16. A method for providing continuous feedback from a printing system, comprising the steps of:

registering with a spooler's application programming interface;

receiving a status message from a spooler of an associated document processing device;

receiving a signal from an image output system of the associated document processing device, the image output system communicatively coupled to the spooler;

receiving registration data at a spooler feedback component associated with the spooler from each of a plurality of associated network clients, the registration data being representative of a request for transmission of status messages for communication thereto;

determining a native language for a network client;

generating a job state message to from the spooler feedback component, wherein the job state is at least one of the group consisting of the status message and the signal;

translating the job state message to a text message content format compatible with a text message content format pre-associated with each of a plurality of different network clients;

periodically pushing each translated job state message to at least one corresponding network client of the plurality of associated network clients in accordance with registration data received therefrom;

filtering the job state message so that only a selected job state message is sent to the network client;

delaying sending the job state message for a first time period;

delaying sending the job state message when a second job state message is received before the first time period expires;

monitoring a volume of a data volume on the associated network; and delaying sending the job state message for a second time period when a second job state message is received in accordance with an output of the network traffic monitoring step and sends only the most recent state message when the second time period expires.

* * * * *